United States Patent [19]

Lang

[11] Patent Number: 5,458,817
[45] Date of Patent: Oct. 17, 1995

[54] FOLDING PACKING AND METHOD OF MANUFACTURE

[75] Inventor: Ko C. Lang, Westlake Village, Calif.

[73] Assignee: Lantec Products, Inc., Agoura Hills, Calif.

[21] Appl. No.: 229,698

[22] Filed: Apr. 19, 1994

[51] Int. Cl.$^6$ ............................................. B01F 3/04
[52] U.S. Cl. ............................. 261/94; 261/DIG. 72
[58] Field of Search ............................. 261/94, DIG. 72

[56] References Cited

U.S. PATENT DOCUMENTS

| | | | |
|---|---|---|---|
| Re. 27,217 | 11/1971 | Eckert | 261/94 |
| 1,480,463 | 1/1924 | Petzel | 261/DIG. 72 |
| 2,047,444 | 7/1936 | Stedman | 261/94 |
| 2,212,932 | 8/1940 | Fairlie | 261/94 |
| 2,546,479 | 3/1951 | Sodano | 219/38 |
| 2,602,651 | 7/1952 | Cannon | 261/DIG. 72 |
| 2,921,776 | 1/1960 | Keeping | 261/94 |
| 3,266,787 | 8/1966 | Eckert | 261/94 |
| 3,295,840 | 1/1967 | Donald | 261/DIG. 72 |
| 3,506,248 | 4/1970 | Starbuck et al. | 261/94 |
| 4,122,011 | 10/1978 | Strigle | 210/150 |
| 4,184,946 | 1/1980 | Kato | 261/DIG. 72 |
| 4,275,019 | 6/1981 | Bednarski | 261/DIG. 72 |
| 4,366,608 | 1/1983 | Nagaoka | 29/157 |
| 4,496,498 | 1/1985 | Pluss | 261/95 |
| 4,519,960 | 5/1985 | Kitterman et al. | 261/94 |
| 4,532,086 | 7/1985 | Pluss | 261/94 |
| 4,557,876 | 12/1985 | Nutter | 261/94 |
| 4,600,544 | 7/1986 | Mix | 261/79 |
| 4,724,593 | 2/1988 | Lang | 29/163.5 |
| 4,731,205 | 3/1988 | McNulty | 261/94 |
| 4,762,650 | 8/1988 | Bosman | 261/DIG. 72 |
| 5,063,000 | 11/1991 | Mix | 261/DIG. 72 |

FOREIGN PATENT DOCUMENTS

| | | | |
|---|---|---|---|
| 0143902 | 6/1985 | European Pat. Off. | 261/DIG. 72 |
| 551071 | 5/1932 | Germany | 261/DIG. 72 |
| 853159 | 10/1953 | Germany . | |
| 1945048 | 10/1969 | Germany . | |
| 2914079 | 4/1979 | Germany . | |
| 3043609 | 7/1982 | Germany | 261/DIG. 72 |
| 3244921 | 12/1982 | Germany . | |
| 96662 | 11/1922 | Switzerland | 261/94 |
| 1301473 | 4/1987 | U.S.S.R. | 261/DIG. 72 |
| 1650222 | 5/1991 | U.S.S.R. | 261/DIG. 72 |
| 374707 | 6/1932 | United Kingdom . | |

*Primary Examiner*—Tim R. Miles
*Attorney, Agent, or Firm*—Marvin E. Jacobs

[57] ABSTRACT

An improved packing body is formed from a strip divided into segments along fold lines. Segments along one side of a medial segment are alternately folded along the fold lines into a stack on the top surface of the medial segment. Segments on the other side of the medial segment are then folded along the fold lines into a stack on the bottom surface of the medial segments. Side segments hingedly connected to the medial or end segments can be folded along the side edges of the stack. Baffle elements can project from the surface of the strip at an angle to the longitudinal axis of the packing body. Tapered strips with a large medial segment disposed to the interior can be folded into a shape approaching spherical.

37 Claims, 4 Drawing Sheets

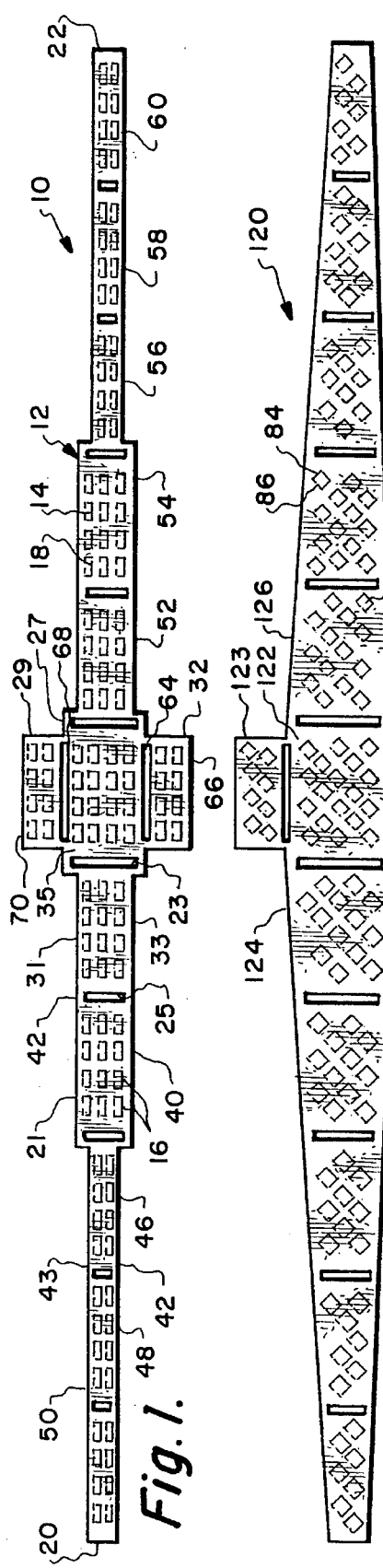
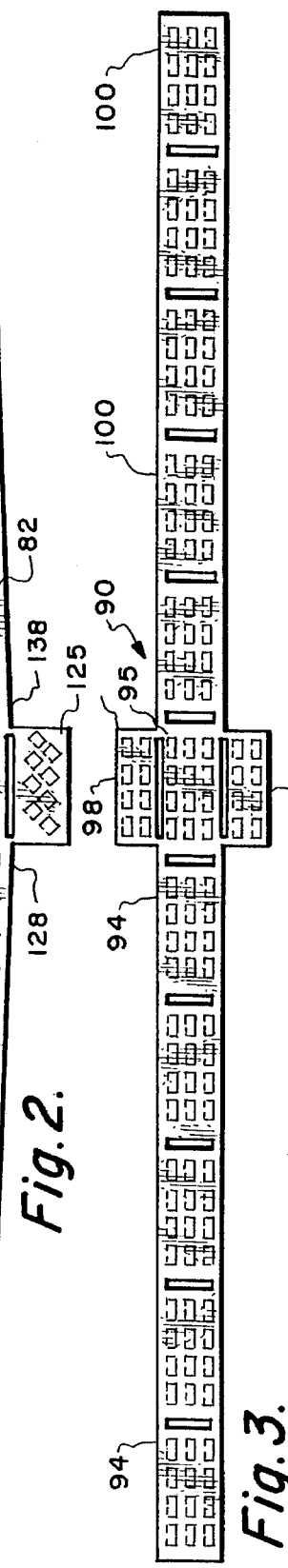
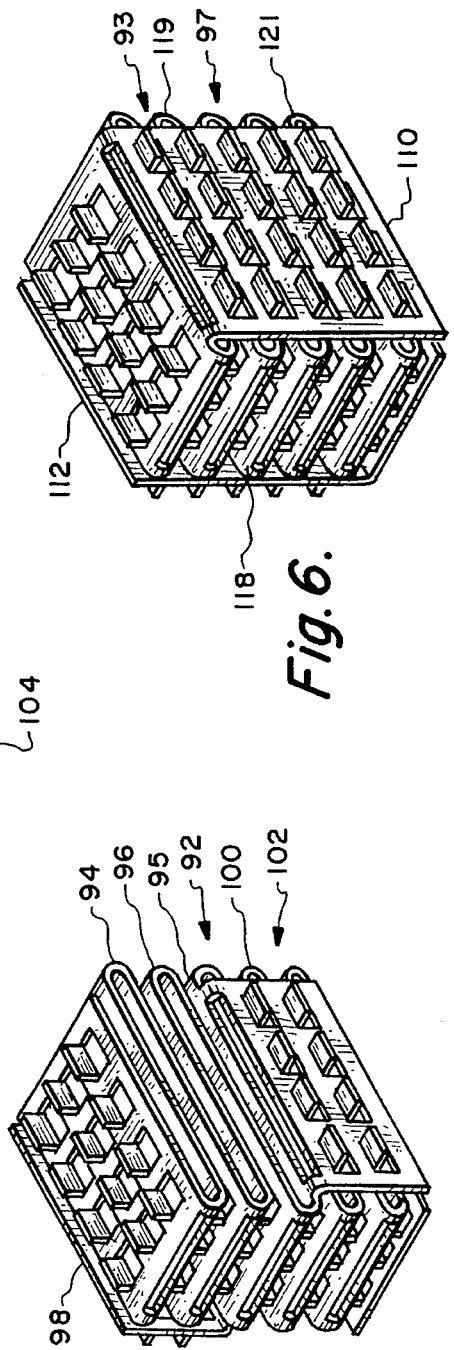
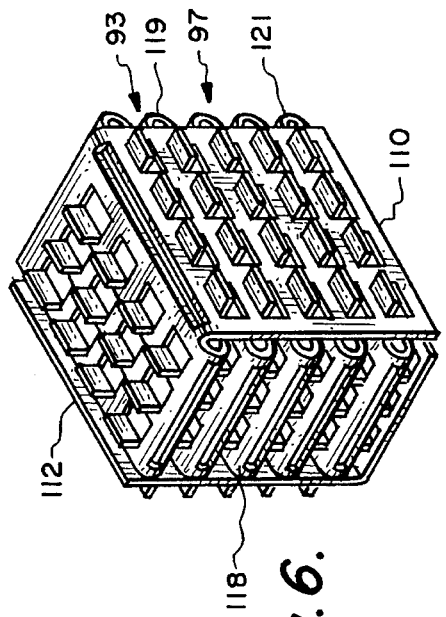
Fig. 1.
Fig. 2.
Fig. 3.
Fig. 4.
Fig. 6.

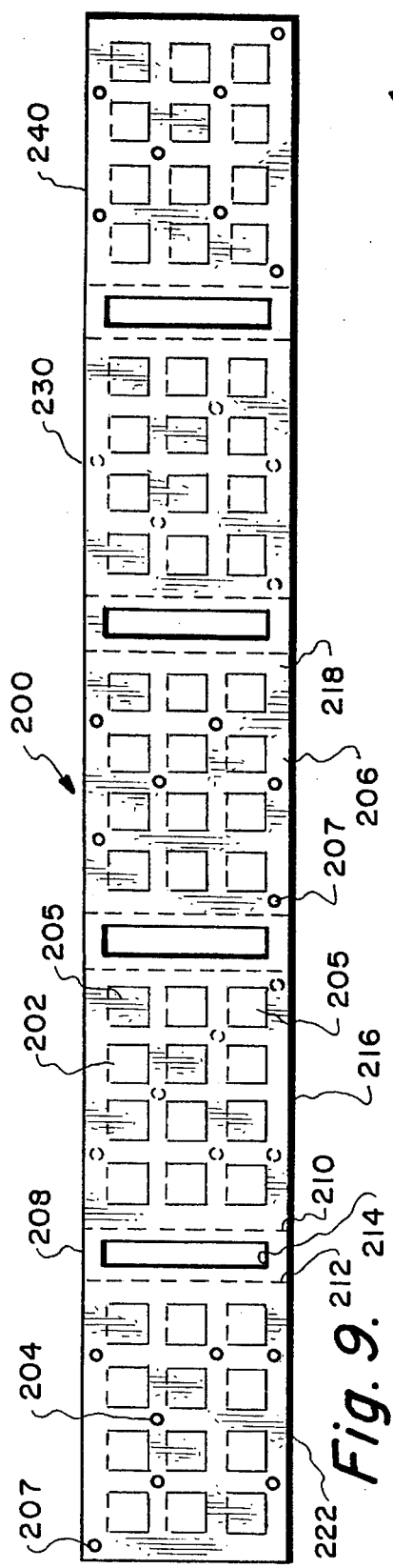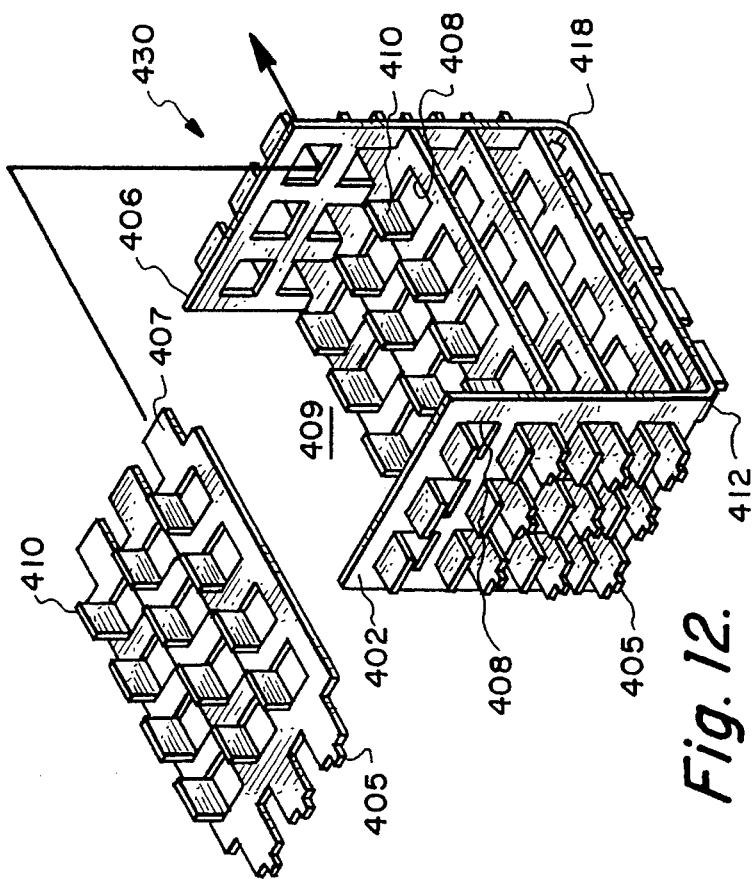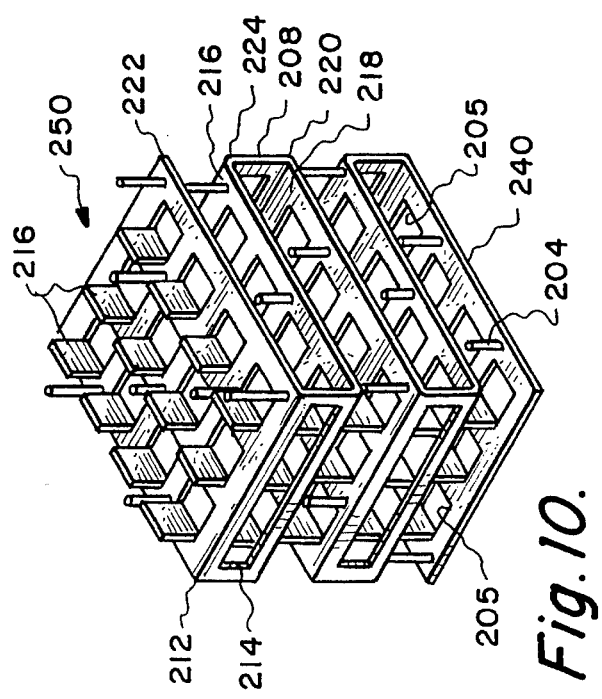

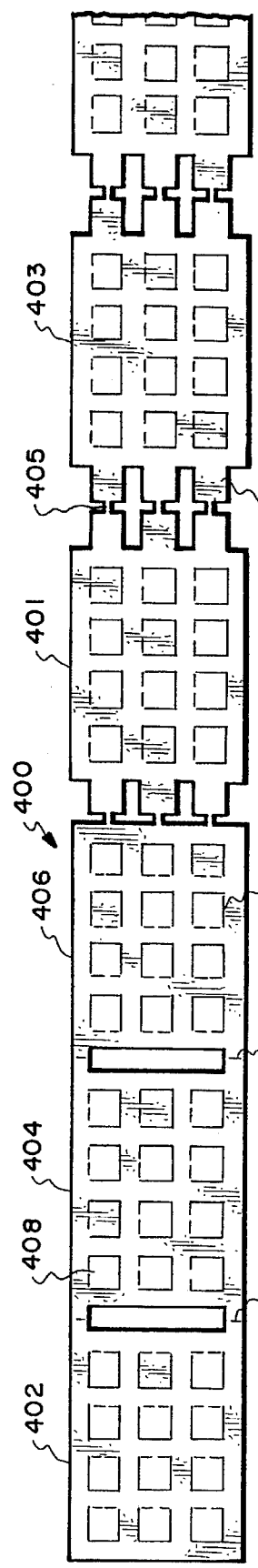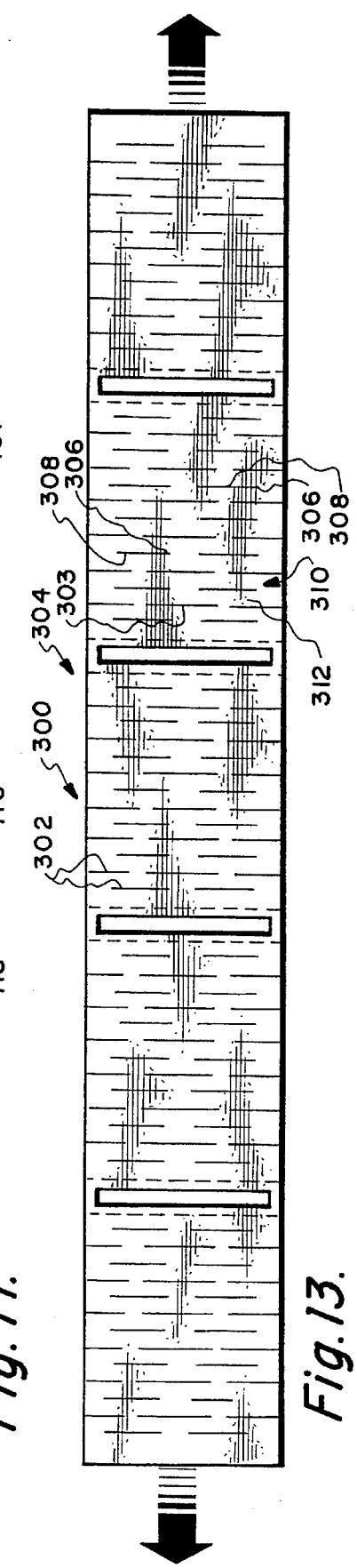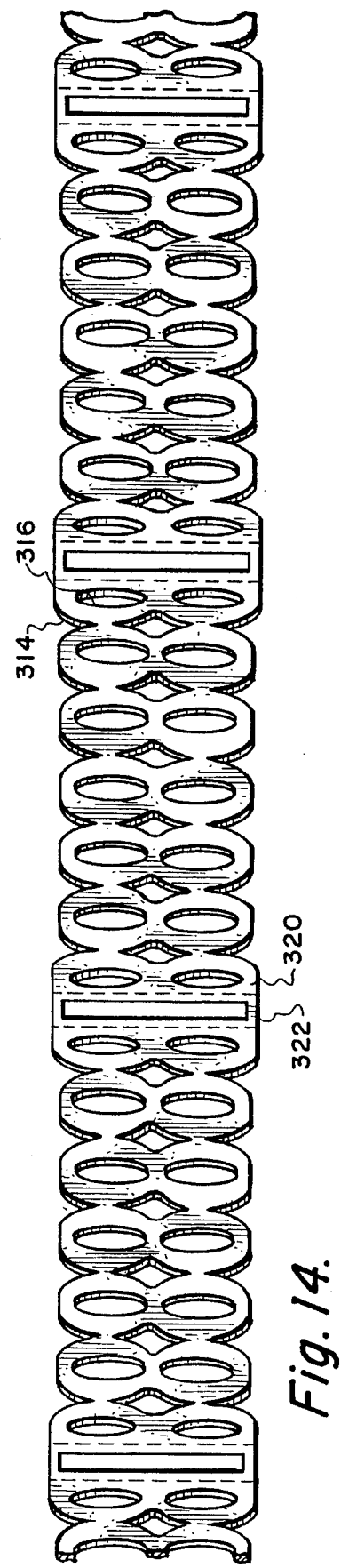

FOLDING PACKING AND METHOD OF MANUFACTURE

TECHNICAL FIELD

The present invention relates to fluid contact structures for use in packed towers and, more particularly, this invention relates to elements formed by folding strip material into complex 3-dimensional shapes.

BACKGROUND OF THE INVENTION

Packed towers are used for mass transfer operations such as absorption, desorption, extraction, scrubbing and the like. The type of packing is chosen for its mechanical strength, resistance to corrosion, cost, capacity and efficiency. The function of the packing is to facilitate mass transfer between two fluid streams, usually moving countercurrent to each other. Efficiency and rate of mass transfer are enhanced by providing large surface area in the packing to facilitate contact of the fluids and by breaking the liquid into very fine droplets to enhance mass transfer to a gas phase.

Packing can be in the form of trays or packing bodies that are randomly packed into a column or tower. Originally, packing elements were ceramic or carbon rings, saddles, partition rings or drip point tiles. More modern packing bodies have a uniform distribution of open cellular units and provide higher efficiency and performance. They have very high wettable surface area and low resistance to fluid flow. They are effective in any orientation. The high efficiency packing bodies can be dump loaded into a column or tower and result in uniform distribution of the packing bodies without having blocked regions or void regions. These packing bodies permit streams to be processed at faster volumetric rates. Efficiency is increased and processing cost is reduced. The high efficiency packing bodies have complex dimensional shapes, usually with numerous struts and projections of different sizes and disposed at different angles and positions throughout the packing body.

However, the intricate structure of the uniformgeometric shapes required for the high efficiency packing bodies requires that they be formed by casting, injection molding, stamping or extrusion, all expensive processes. Extrusion processes are limited since they generally are used to form shapes with axial symmetry. Also molding processes forbid the use of shapes such as undercuts and overlapping shapes since they cannot be released from ordinary molds. Multipart molds are prohibitively expensive. Thus, much of the internal volume is open space decreasing effective surface area. Baffle structure perpendicular to the longitudinal axis of the packing body is less than the optimum.

Metal packing bodies or elements are required for certain high temperature or chemically aggressive process streams. Most metal packing bodies are formed from metal blanks rolled into a tubular or spherical shape. Tabs or tongues may be cut and bent toward the interior to provide projections to increase surface area and enhance mixing and droplet formation. Again, there is substantial open area and efficiency is less than desired.

U.S. Pat. No. 4,724,593 describes an improved method for manufacturing high performance, symmetrical, open volumed packing bodies. The packing bodies have uniform geometrical configurations and are formed from a wide variety of materials into a wide variety of shapes and geometries. The process is simple and economical. A strip of sheet material has a pattern of repeating plates which are connected by intermediate ribbons of the sheet material. The plates may be perforated or contain projections. The plates are bent perpendicular to the longitudinal axis of the strip. The intermediate ribbons are then bent to bring the longitudinal axis of the bent plates into close proximity and in substantial parallel alignment.

The high performance packing bodies have performed well and have captured a significant share of the market. They have been manufactured in plastic or metal materials. These packings have low pressure drop, high mass transfer and packing efficiency. They have a high population of drip points per volume provided by a uniform distribution of surface elements. An open, non-obstructive structure provides low pressure drop while dispersing and distributing flow in both longitudinal and lateral directions.

While the void volume of the interior structure of the packing body is less than prior high efficiency packing bodies, the structure normal to the longitudinal axis is still difficult to provide and the manufacture requires several bending and rolling operations to form the sheet material into an element.

An improved packing body is disclosed in copending application, Ser. No. 08/147,806, filed Nov. 3, 1993, the disclosure of which is expressly incorporated herein by reference. The improved packing bodies are also formed from a strip of material. However, the perforated panels are not separated by ribbon connectors. A perforated strip of material is simply rolled into a spiral or into a concentric cylinder structure. The outer curved end of the strip is latched to the curved surface of the preceding revolution of the spiral. Baffle or tab elements disposed transverse to the surface of the strip efficiently disrupt the fluid stream. The tabs can be rod like elements raised from the surface. The improved packing bodies have a high degree of open space, from 30% to 98%. Surprisingly, the rolled packing bodies are found to provide better mass transfer and efficiency than prior packing body structures.

STATEMENT OF THE INVENTION

In accordance with the invention packing bodies with complex shapes are also produced in a simplified manner from elongated apertured strips. The strips are formed into segments and the segments on each side of a medial segment are folded toward the top surface of the medial segment and segments on the other side are folded toward the bottom surface of the medial segment. The segments may be provided with single or double fold lines to facilitate folding the strip material without bending or stressing the strip material.

In a further embodiment the segments are separate perforated units and are stacked in parallel relation. They are fixed in that relation by projections from the surfaces of the segments or side members such as bent or separate perforated side plates adhered to the side edges of the stacked segments.

The projections from the surface of the segments can also be used to disrupt large droplets, to create local turbulence, to increase contact between gas and liquid and to facilitate mass transfer. The projections can be polygonal tabs raised from the surface. The tabs can be diamond, rectangular or circular in shape. Thin cylindrical rod projections from the surface have been found to be very effective in facilitating mass transfer while providing an open volume of above 30% with very low pressure drop.

Another method of forming efficient baffle and apertures is to provide a pattern of slits in a strip of metal or other expandable material. When the strip is stretched, the slits expand and the panels of the strip of material between adjacent parallel slits tilt upwardly at an angle to the surface. The slit widens into an elongated aperture.

The folded strip has a high degree of open space provided by perforations, at least about 30% of the strip is open space, preferably from 50% to 98% of the strip is open space. The baffle tabs attached to the strip provide increased surface for fluid contact. If the tabs are at an angle to the longitudinal axis of the rolled packing body they could be in the path of the flow liquid and will act to disrupt the liquid into smaller droplets. The tabs can be any shape such as curved, rectangular, triangular, square, etc. The tabs can be formed by cutting a partial perimeter of the tab from the sheet material leaving a live hinge. The live hinge is then bent to dispose the tab away from the sheet. A strip could also be molded with tabs raised from the surface of the strip. The raised tabs simultaneously form apertures in the sheet. The tabs can also act as spacers between adjacent arcuate sections of the rolled strip. The tabs can face upwardly and/or downwardly. The tabs can be disposed normal to the surface of the sheet or at a lesser or greater angle, usually from 20 degrees to 160 degrees.

The strip is formed of a material that has a flexible and bendable first state such as metal, B-stage thermosetting resins, thermoplastic resins or ceramic precursors such as metal oxides dispersed in organic binder resin. The perforated strip can be formed by stamping, cutting and bending operations with metal strips or certain plastic strips. Other strips can be formed by casting, molding or extrusion of ceramic or resin materials. After the bent strip is in its final configuration, the bent strip can be fired to cure the resin or convert the precursor to a final ceramic state.

The packing body of the invention can be produced from much simpler starting materials. Even if molds are used to form the strips, the molds are much cheaper and simpler than molds used to form prior high performance packing bodies. The method of the invention can be used to form packing bodies in complex shapes that can not be practically made by other techniques. The packing bodies of the invention can be produced at much lower costs and can be made from plastic, metal or ceramic.

These and many other features and attendant advantages of the invention will become apparent as the invention becomes better understood by reference to the following detailed description when considered in conjunction with the ACCOMPANYING drawings.

BRIEF DESCRIPTION OF THE DRAWINGS

FIG. 1 is a top view in elevation of a first embodiment of an apertured strip for forming a packing body according to the invention;

FIG. 2 is a top view in elevation of a second embodiment of an apertured strip for forming a folded packing body;

FIG. 3 is a top view in elevation of a further embodiment of a strip for forming a folded packing body;

FIG. 4 is a perspective view of a folded packing body formed from the strip of FIG. 3;

FIG. 6 is a perspective view of a packing body formed by folding the strip of FIG. 5;

FIG. 9 is a top view of another embodiment of a strip containing a plurality of rod-like projections;

FIG. 10 is a perspective view of a folded packing body formed from the strip of FIG. 9;

FIG. 11 is a top view in elevation of yet another embodiment of an apertured strip with attached plates;

FIG. 12 is a perspective assembly view of the folded strip of FIG. 11 joined to the plates;

FIG. 13 is a top view in elevation of an expandable strip with slits; and

FIG. 14 is a top view of an expanded metal strip.

DETAILED DESCRIPTION OF THE INVENTION

Figure 8:
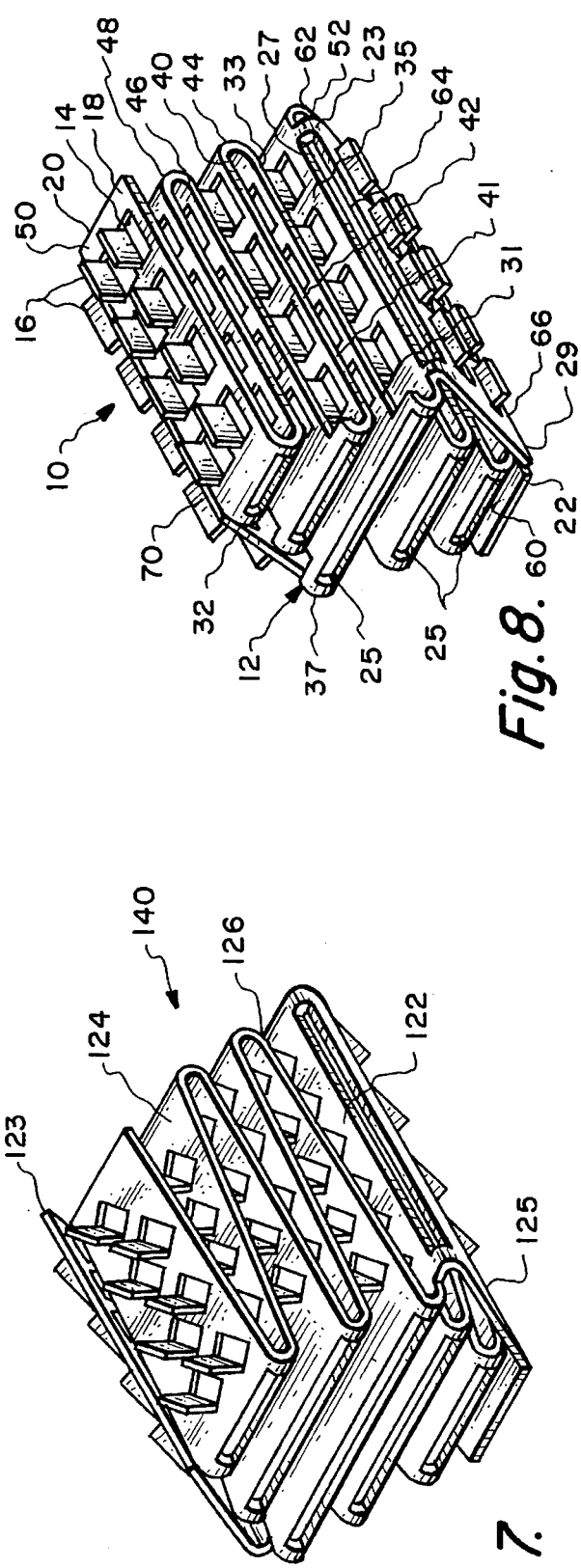
FIG. 8 is a perspective view of a packing body formed from folding the strip of FIG. 1.

Referring now to FIGS. 1 and 8, the improved packing body 10 is formed of a strip 12 having at least 30% open space provided by apertures 14. The strip 12 can have a thickness from 0.1 to 15 mm. In the case of metal, the thickness is usually from 0.2 to 0.4 mm. In the case of plastic, the thickness is usually from 0.5 to 3 mm, preferably 1 to 2 mm and in the case of ceramic, the strip has a thickness from 2 to 8 mm.

The strip 12 may also include baffle elements that project from the surface 18 of the strip 12 such as rod like struts or polygonal elements such as rectangular baffles 16. The strip is continuous from a first end wall 20 to a second end wall 22. The strip is divided into segments 21 separated by folding bands 23. The bands may contain a transverse slot 25 and can contain a score line, not shown, to act as a live hinge. The medial segment 27 which is usually the middle segment can contain a pair of side segments 29, 32. A packing body 10 is formed by folding the front segment 31 adjacent the medial segment 27 along fold band 23 at a right angle to the longitudinal axis of the strip 12 until the top surface 33 of the segment 31 is substantially parallel to the top surface 35 of the medial segment 27. The folding band 23 will form a curved side edge 37 containing slot 25.

The next adjacent front segment 40 is then folded along folding band 42 toward the segment 31 until the original bottom surface of the segment 41 is substantially parallel to the folded segment 31. Folded band 42 forms a second curved side edge 44 containing a slot 25. Front segments 46, 48 and 50 are alternately folded into parallel disposition.

The rear segments 52, 54, 56, 58 and 60 are folded by first folding segment 52 along band 62 such that the bottom surface 64 of the segment 52 is substantially parallel to the bottom surface of the medial segment 27. The folded band 23 forms a curved edge 62. Segments 54, 56, 58 and 60 are alternately folded along bands 23 to form a stack of segments connected by curved side joints. Lower side segment 32 is folded along slot 64 until the lower edge 66 is adjacent the end rear segment 60. Upper side segment 29 is folded along the slot 68 until the upper edge 70 of the side segment is adjacent the end front segment 50.

The strip has a pattern of apertures 14 formed by raised rectangular baffle elements 16. The baffle elements in this embodiment of a packing body are disposed parallel to the longitudinal axis of the strip. The baffle elements are attached to the surface of the strip along an edge 43 which is joined to the strip. The baffle elements may project upwardly, downwardly or some may project upwardly and some may project downwardly.

The length and width of the strip 12 are determined by the nominal diameter and height desired for the packing body 10, the size of segments and the surface area. Packing bodies generally have a diameter from 1 to 12 inches and the height is about 1 to 10 inches. Usually the diameter to height ratio is at least 1. A packing body will generally have a packing factor from about 3 to 65 per foot and a surface area from about 10 to 200 ft²/cu.ft.

The width of the strip at its widest dimension corresponds to the height of the packing body. Generally, the strip will be at least 5 inches long up to 100 inches or more. The spacing between folded segments depends on the height of the baffle elements. Generally, the baffle elements have a height from 1/16 to 2.0 inches. The packing body will have at least 2 segments preferably from 3 to 30 segments. Random packing bodies are generally from 1 to 5 inches in nominal diameter, have a height from 1 to 4 inches and a baffle from 1/16 to 3/4 of an inch. The method of the invention could also be used to produce large molecular structured packing bodies in cubic or rectangular-shaped modules such as 1'×1'×1'; 2'×1'×1' or 3'×1'×1'. The structured modules are placed one module at a time into the tower until the tower is filled.

Figure 5:
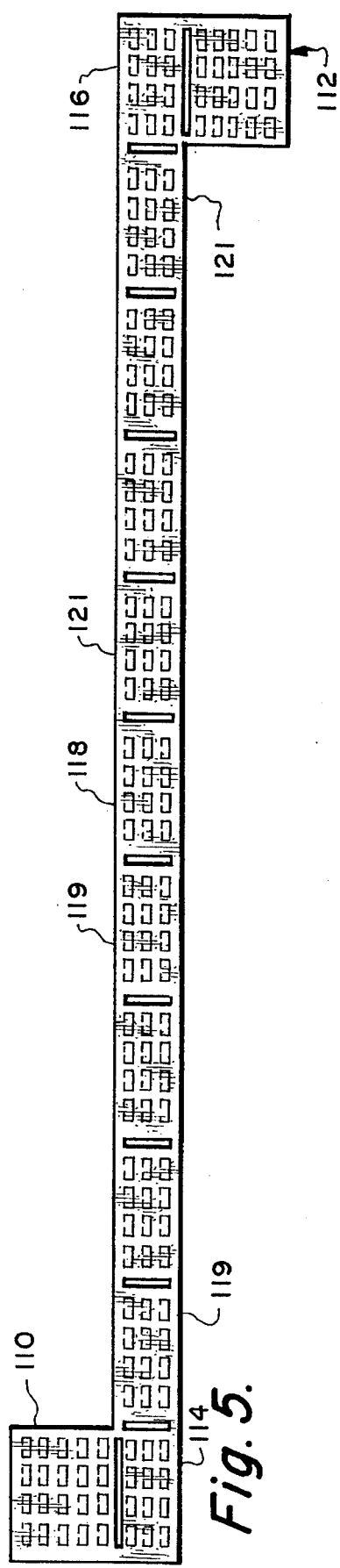
FIG. 5 is a top view in elevation of another embodiment of a strip for forming a folded packing body.
Figure 7:
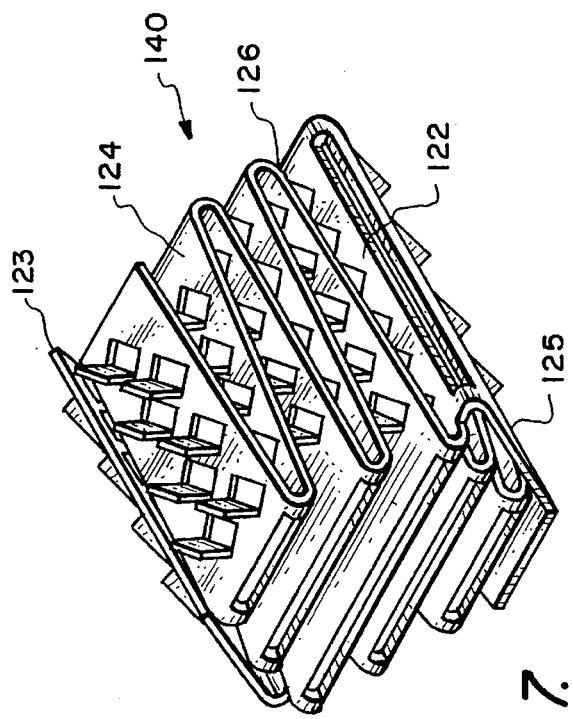
FIG. 7 is a perspective view of the strip of FIG. 2 folded into a packing body.

The strip can be in the form of a rectangle having parallel side walls as in FIGS. 3 and 5 or the strip can have shaped sided walls such as convex, concave, patterned or converging as in FIG. 2. The segments of the strip can step down in width in discrete steps as in FIG. 1. If the side walls of the strip are parallel, the strip will fold into a cubic or rectangular-shaped body. If the strip has tapered or stepped side walls, it will fold into an x-shaped structure if the smaller medial segment is disposed to the interior and into a polygon-shaped body if the larger medial segment is disposed to the interior of the packing body 10 as shown in FIGS. 7 and 8.

The strip shown in FIGS. 9 and 10 has a very open structure like a mesh or a screen. In the embodiments shown in FIGS. 1–8, the strip is formed of sheet material. The baffle elements and the apertures can be formed by stamping and bending appropriate materials such as metal, certain plastics and certain precursor ceramics or they can be formed by molding in simple molding cavities or by casting. The apertures are formed in sheet material raised from the surface along integral connection joints to form the baffle elements. In the case of bendable materials, the baffle element can be cut along three sides and bent along the fourth side to form the apertures.

In FIGS. 1, 3 and 5 the baffle elements are shown bent away from the surface of the strip along a connection joint parallel to the longitudinal axis of the strip. In FIG. 2, the baffle elements 82 are shown with cut lines 84 along 3 sides joining bend line 86 which is at a 45 degree angle to the longitudinal axis of the strip.

The rectangular strip 90 of FIG. 3 is similar to the stepped down strip 12 of FIG. 1. When the strip 90 is folded as in FIG. 1 it will form a rectangular packing body 92 as shown in FIG. 4 with the front segments 94 folded on top of the medial segment 95 to form a top stack 96 with side segment 98 folded upwardly. The rear segments 100 similarly fold downwardly to form a bottom stack 102 with side segment 104 folded downwardly.

FIG. 5 is similar to FIG. 3 except that the side segments 110, 112 are disposed on opposite sides of the end front segment 114 and end rear segment 116. The front segments 119 are alternately folded on top of the medial segment 118 to form a top stack 93 and the rear segments 121 are alternately folded on the bottom of the medial segment 118 to form a bottom stack as shown in FIG. 6. The side segment 110 is then folded downwardly along the side edges of the stack and the side segment 112 is folded upwardly along the opposite side edges of the stack to form a packing body 97.

The strip 120 shown in FIG. 2 is tapered in both directions. It has a medial segment 122 and adjacent front and rear segments 124, 126 with bending bands 128 separating the segments. The baffle elements 82 are rectangular with the sides rotated 45 degrees with respect to the longitudinal axis of the strip 120.

When the top segments 124 are folded and stacked on top of the medial segment 122 and the bottom segments are folded and stacked along the bottom of the medial segment 122. A packing body 140 having hexagon cross-section as shown in FIG. 7 is formed. The side segment 123 is folded upwardly and the other side segment 125 is folded downwardly.

If the strip is formed of resilient material, the shape of the packing body can be stabilized by providing latches between apertures in adjacent segments by securing the side edges of the segments to each other or to the medial segment or by securing the side edges of the segments to the side segments by mechanical latches, adhesives or thermal bonding in the case of thermoplastic resins or metals.

A further embodiment of a packing body is shown in FIGS. 9 and 10. A strip 200 has a very open structure provided by apertures 202. A pattern of rod-like baffle elements 204 are raised from the surface 206 of the strip 200. Some of the elements 207 are longer and are adapted to enter an aperture 205 in an opposed segment and latch the segments together.

Each segment is separated from the adjacent segment by a band 208 containing a set of parallel score lines 210, 212. The band may also contain an elongated aperture 214. As shown in FIG. 10 as the first front segment 216 is folded, the band 208 will fold along the live hinge 220 formed at score line 210 and the band 208 will be disposed at a right angle to the medial segment 218. The vertical band 208 will then fold along score line 212 at a right angle to the next front segment 222 to form a second live hinge 224. The front segment 222 is bent to be disposed parallel to the medial segment 218.

Some of the longer baffle elements 207 projecting from the surface of the medial segment 218 are snapped into the opposed apertures 205 in the folded segment 216. The rear segments 230 and 240 are then alternately folded to form the packing body 250 shown in FIG. 10.

Another method of assembling a packing body is shown in FIGS. 11 and 12. A strip 400 has three segments 402, 404, 406 containing apertures 408 and baffles 410 and a series of panels 401, 403 connected by tabs 405 between projections 407. The panels 401, 403 also contain apertures 408 and baffles 410. The end segments 402,406 are bent upwardly along scored fold lines 418,412 to form a u-shaped shell 409. The panels 401 and 403 are separated by breaking the tabs 405. The individual panels 401, 403 having the same length and width as the medial segment 404 are placed within the shell 409 in a position parallel to the medial segment 404. The side projections 407 are inserted into the apertures 408 in the segments 402, 406 to lock the structure together into a packing body 430. The individual segments could be adhered together with a set of side strips or individual side plates or segments.

Another way to form an apertured, baffled strip in a single operation is shown in FIGS. 13 and 14. A strip 300 of expandable material such as metal contains a pattern of slits 302. The slits 302 are preferably disposed transverse to the longitudinal axis of the strip 300. The slits 303 in a first row 304 overlap the ends 306 of two slits 308 in an adjacent row 310. As the strip 300 is expanded the panels 312 between slits such as 303 and 306 in adjacent rows will tilt upwardly to form baffle elements 314 and apertures 316. The strip 300 can be rolled to form a cylindrical packing body or folded along fold lines 320, 322 to form a rectangular folded packing body, not shown.

The invention provides high performance packing bodies in complex shapes by simple, low cost fabrication techniques. The intricate shapes are defined in planer materials readily formed by casting, molding, stamping or extrusion. The manufacture is completed by a simple folding step. By use of strips having different widths, lengths or thicknesses, packing bodies having complex shapes can be produced. Packing bodies of different sizes can be filled into a tower.

It is to be realized that only preferred embodiments of the invention have been described and that numerous substitutions, modifications and alterations are permissible without departing from the spirit and scope of the invention as defined in the following claims.

I claim:

1. A packing body for use in fluid contact comprising:

an elongated, continuous strip having a pattern of apertures formed through the strip and said strip being divided into at least three segments along the longitudinal axis with a medial segment having a front edge and a rear edge transverse to said longitudinal axis;

a first front segment adjacent the front edge;

a first rear segment adjacent said rear edge;

a fold present in said first front segment along said front edge to fold said first front segment toward the top surface of the medial segment until the angle between said segment and said top surface is no less then about 90 degrees; and a fold present in said first rear segment along said rear edge to fold the said first rear segment toward the bottom surface of the medial segment until the angle between said segment and said top surface is no less then about 90 degrees.

2. A packing body according to claim 1 in which all the segments are of substantially the same width.

3. A packing body according to claim 1 further including support means for joining the side edges of the front or rear segments on at least one side of the packing body.

4. A packing body according to claim 1 further including spacer means disposed between the opposed top and bottom surfaces of adjacent segments.

5. A packing body according to claim 1 in which the strip has apertures providing at least 30% open space.

6. A packing body according to claim 1 in which the strip is formed of metal, synthetic resin or ceramic.

7. A packing body according to claim 1 in which said first front segment being folded along said front edge until it is substantially parallel with the medial segment and the first rear segment being folded along the second edge until the first rear segment is substantially parallel with the medial segment.

8. A packing body according to claim 7 which the length of the first front and rear segments does not exceed the length of the medial segment.

9. A packing body according to claim 7 in which the segments adjacent the medial insert have a width smaller than the width of the medial segment.

10. A packing body according to claim 1 in which the medial segment has first and second side edges and an apertured side segment is disposed adjacent at least one of said side edges and said side segment is folded along said side edge in a position substantially perpendicular to said medial segment.

11. A packing body according to claim 10 further including means of adhering the side segments to opposed side edges of the front and rear segments.

12. A packing body according to claim 10 in which the apertures are elongated slots transverse to the longitudinal axis of the strip.

13. A packing body according to claim 12 in which panels of strip material between the slots are raised from the surface of the strip at an angle from 10 degrees to 80 degrees.

14. A packing body according to claim 1 including a plurality of front segments consecutively connected along the longitudinal axis, adjacent front segments having a common edge and being folded along said common edge with the bottom surface thereof facing the top surface of the preceding folded segment.

15. A packing body according to claim 14 containing from 1 to 10 front segments.

16. A packing body according to claim 14 including a plurality of rear segments consecutively connected along the longitudinal axis and adjacent rear segments having a common edge and being folded along said common edge with the top surface thereof facing the bottom surface of the preceding folded segment.

17. A packing body according to claim 16 containing from 1 to 10 rear segments.

18. A packing body according to claim 17 in which the rear and front segments are folded into a position substantially parallel to the medial segment.

19. A packing body according to claim 16 in which the last front segment has a side edge and a first side segment is connected to said last front segment along said side edge and said side segment is folded upwardly along said edge until the top surface of the side segment is adjacent the side edges of the folded front segments.

20. A packing body according to claim 19 in which the last rear segment has a first side edge on the opposite side of the strip from that of the first side edge and a second side segment is connected to the last rear segment along said second side edge and said last rear segment is folded downwardly along said second side edge until the bottom surface of said second side segment is adjacent the side edges of the folded rear segments.

21. A packing body according to claim 1 further including tab elements that project away from the surface of the strip and form at least some of said apertures.

22. A packing body according to claim 21 in which at least some of the tab elements are perpendicular to the longitudinal axis of the strip.

23. A packing body according to claim 21 in which the tab elements are formed of strip material disposed upwardly and away from the top or bottom surface of the strip.

24. A packing body according to claim 23 in which the tab elements are molded with the strip.

25. A packing body according to claim 1 further including a live hinge being disposed along at least one of said folds.

26. A packing body according to claim 25 in which said fold includes a pair of parallel live hinges spaced on each side of a transverse band of strip material and said band forms an angle of about 90 degrees with the surface of adjacent segments.

27. A method of forming a packing body for use in fluid contact comprising the steps of:

forming an elongated, continuous strip of flexible, foldable material having a pattern of apertures;

providing fold lines spaced along the longitudinal axis of the strip to form segments having fold lines on each front and rear edge thereof;

folding the strip along a front fold line of a medial segment of the strip until the top surface of a front segment adjacent the medial segment is substantially parallel to the top surface of the medial segment; and folding the strip along a rear fold line of the medial segment until the bottom surface of a rear segment adjacent the medial segment is substantially parallel to the bottom surface of the medial segment.

28. A method of manufacturing a packing body for use in fluid contact comprising the steps of:

forming slits in an elongated strip of material;

stretching the strip along the longitudinal axis such that the slits expand into elongated slots and the panels of the strip material between adjacent slots are raised from the surface at an angle from 10 degrees to 80 degrees; and folding the strip along fold lines transverse to the longitudinal axis of the strip until adjacent segments are substantially parallel to each other.

29. A method according to claim 28 in which the slits are disposed in a direction transverse to the longitudinal axis of the strip.

30. A method according to claim 28 in which the strip is formed of metal.

31. A packing body for use in fluid contact comprising in combination:

a plurality of individual panels containing a pattern of apertures;

means spacing a plurality of the panels into a stacked arrangement;

a side panel joined to a side edge of the top and/or bottom panel of the stacked arrangement and said side panel being folded adjacent the side edges of the panels in said stacked arrangement; and means joining the panels together into said stacked arrangement.

32. A packing body according to claim 31 in which said side panel is connected to said side edges.

33. A packing element for use in fluid contact comprising in combination:

a plurality of individual panels containing a pattern of apertures;

fluid baffle means raised from the top and/or bottom surfaces of the panels comprising a plurality of rod-like elements projecting from said surface;

means spacing a plurality of the panels into a stack comprising a portion of the rod-like elements which are longer than other of said elements; and means latching the panels together.

34. A packing element according to claim 33 in which the longer rods enter an aperture in the opposed panel to latch said panels together.

35. A packing element according to claim 33 in which said rods are cylindrical.

36. A packing element according to claim 33 molded from synthetic organic resin.

37. A packing element according to claim 33 having at least 30% open space.

* * * * *